United States Patent [19]

Woods et al.

[11] 4,023,442

[45] May 17, 1977

[54] AUTOMATIC CONTROL MEANS FOR INFINITELY VARIABLE TRANSMISSION

[75] Inventors: Robert L. Woods, Kensington, Md.; Karl N. Reid, Jr., Stillwater, Okla.; Rajamouli Gunda, Rochester, Mich.

[73] Assignee: Oklahoma State University, Stillwater, Okla.

[22] Filed: July 7, 1975

[21] Appl. No.: 593,834

Related U.S. Application Data

[63] Continuation of Ser. No. 388,833, Aug. 16, 1973, abandoned.

[52] U.S. Cl. .................................. 74/863; 74/861
[51] Int. Cl.² ........................................ B60K 41/16
[58] Field of Search ............ 74/861, 862, 863, 864, 74/865, 856, 857, 858, 859, 860, 866; 60/431, 445, 449, 459

[56] References Cited

UNITED STATES PATENTS

| | | | |
|---|---|---|---|
| 3,121,483 | 2/1964 | Lietz | 74/863 X |
| 3,360,069 | 12/1967 | Chana et al. | 74/859 X |
| 3,738,197 | 6/1973 | Brumm et al. | 74/861 X |
| 3,741,042 | 6/1973 | Ravenel | 74/863 |
| 3,855,793 | 12/1974 | Pollman et al. | 60/431 |
| 3,927,528 | 12/1975 | van der Kolk et al. | 74/861 X |
| 3,932,991 | 1/1976 | Clerk | 60/431 |

Primary Examiner—Samuel Scott
Assistant Examiner—Lance W. Chandler
Attorney, Agent, or Firm—Head, Johnson & Chafin

[57] ABSTRACT

This invention describes a system of control for a power source-transmission-load system such as might be used on an off-the-road vehicle, for example. The power source is an internal combustion engine having a known optimum characteristic of desired manifold vacuum versus engine speed. The transmission is a hydrostatic or hydromechanical transmission having infinitely variable speed ratio and having a control means for varying said speed ratio.

The control system includes a transducer means for measuring engine speed and converting this quantity into an analog fluid pressure proportional to the speed. This analog fluid pressure proportional to speed is modified in a function generator to produce an analog fluid pressure which is proportional to the desired manifold vacuum as a function of engine speed. Means are provided for measuring the actual manifold vacuum and for comparing the actual manifold vacuum with the desired manifold vacuum on a continuous basis. This comparison produces an error signal which is amplified and used to control a hydraulic system to operate the control means in order to vary the transmission ratio of the hydrostatic or hydromechanical transmission to obtain a speed ratio such that will provide optimum engine conditions.

8 Claims, 12 Drawing Figures

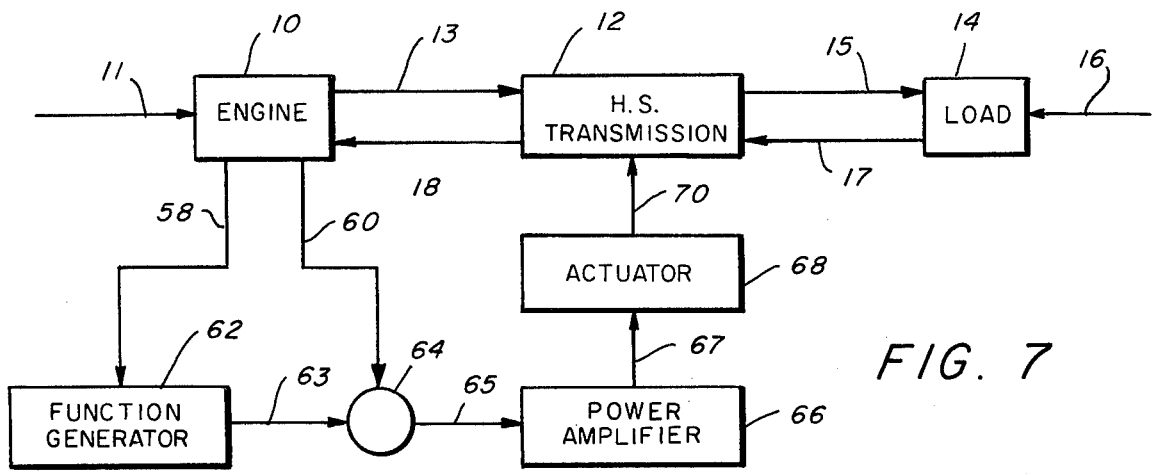
FIG. 7
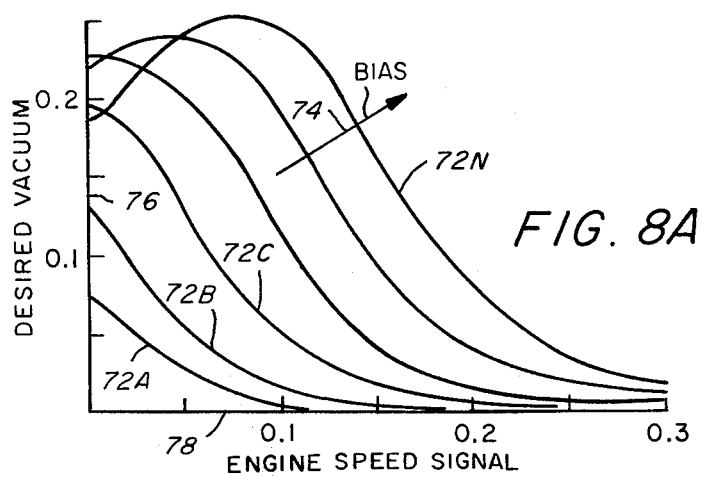
FIG. 8A
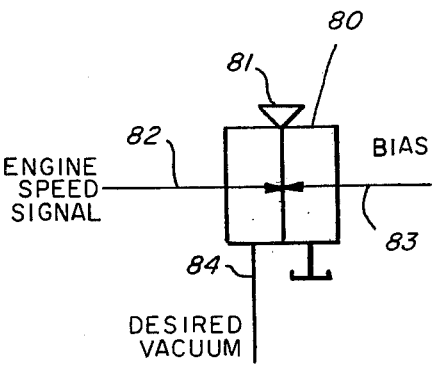
FIG. 8B
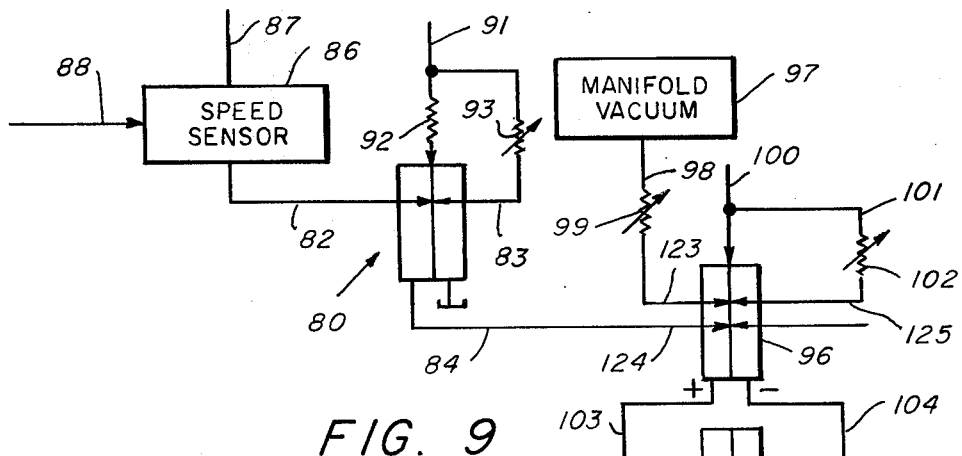
FIG. 9
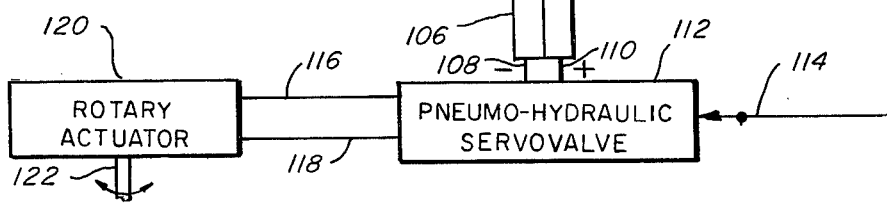

AUTOMATIC CONTROL MEANS FOR INFINITELY VARIABLE TRANSMISSION

This is a continuation of application Ser. No. 388,833, filed Aug. 16, 1973, which is now abandoned.

BACKGROUND OF THE INVENTION

Ever increasing demands are being placed on designers to provide near optimum propulsion systems for advanced commercial and military vehicles of all types. Propulsion systems are needed which provide improved fuel economy, better maneuverability, less operator skill and fatigue, more adaptability to load, faster acceleration, greater safety, increased engine life and improved maintainability.

A vehicle propulsion system consists of a power source, or an engine, a power transfer device or transmission, and controls which couple the engine and the transmission for smooth and efficient vehicle control. If well designed, the transmission can provide the proper match between engine and load in order to maximize fuel economy and overall performance, and to eliminate stalling of the engine under maximum transmission loading conditions.

There is an increasing trend toward the use of hydrostatic and split path hydromechanical transmissions for high performance vehicles. The overall efficiency of a vehicle propulsion system can be greater with a hydrostatic transmission (HST) than with a straight mechanical transmission under certain duty cycles, even though the HST is the lesser efficient transmission of the two. The reason for this apparent paradox lies in the infinitely variable speed capability of the HST and its resulting superior controllability.

The simplest and most common way to control a vehicle propulsion system with an HST is to govern the engine to a nearly constant speed and control the transmission manually. Except for inherent feedback provided by the operator, the transmission control is open loop. This method is adequate if the system's inefficiencies are primarily those of the engine, as is the case with the straight mechanical transmission. However, when the relatively low efficiency HST is used, instead of a mechanical transmission, the overall system efficiency is less with this open loop design.

The HST is especially suitable for closed loop control. With proper closed loop control the engine can be forced to operate at its best efficiency under all throttle and load conditions. This invention is directed to a type of system which involves closed loop control with an HST having an infinitely variable transmission ratio.

In the prior art there have been a number of different types of control systems, some semiautomatic, that is, partially manual and partially automatic, and some automatic, but each of them were dependent upon two or more variables chosen from a wide group of variables. The most common parameters which have been used to control the engine have been the speed and throttle position. These are normally handled by a governor type of mechanism in which the actual throttle position at the engine is a function of a desired throttle position produced by the governor and a manual throttle position produced by the operator.

Because of the basic engine characteristics of the internal combustion engine, the relationships between the various parameters such as speed, vacuum, throttle position, load ratio, etc. taken in pairs is rarely, if ever, a linear relationship. Thus, the control system must provide means for converting one variable to another, even where the characteristic is nonlinear. Therefore, in the choice of variables which are used to control the engine, it is important to choose two variables which are basically important in the control of the engine. Also the two variables should be related to each other in a certain characteristic function which can be duplicated by physical apparatus.

SUMMARY OF THE INVENTION

It is a primary object of this invention to provide a control system which can be used to control the speed ratio of a hydrostatic transmission, when used in conjunction with an internal combustion engine and a load.

More particularly, it is an object of this invention to provide infinitely variable control of the speed ratio of the transmission in terms of two parameters of the engine operation.

It is a further object of this invention to use the parameters of engine speed and of engine manifold vacuum for control of the HST.

It is a still further object of this invention to use a fluidic type control system in combination with hydraulic amplification and control actuation.

These and other objects are realized and the limitations of the prior art systems are overcome in this invention by using in combination with an internal combustion engine and an HST, a control system which utilizes engine speed and manifold vacuum as input control variable. The use of a function generator that accounts for both engine and transmission inefficiencies is also an important part of the invention.

The system includes a transducer means to measure the engine speed and convert this to an analog fluid pressure, proportional at all times, to the speed. This first analog fluid pressure of engine speed is modified in a function generator, the characteristic of which is closely fitted to the actual characteristic of desired manifold vacuum versus engine speed. The output of this function generator is a second analog fluid pressure proportional to the desired manifold vacuum. The actual manifold vacuum is measured, and the desired and actual values of vacuum are compared in a differential summing means, so that an error signal is provided, the magnitude of which is a measure of the difference between the desired and the actual manifold vacuum. The output of this summing device is amplified and the output of the signal amplifier is used to control a pneumatic-hydraulic servovalve (power amplifier) which controls hydraulic fluid pressure to a hydraulic actuator. This actuator is directly connected to the control means on the transmission and is used for changing the speed ratio of the transmission.

BRIEF DESCRIPTION OF THE DRAWINGS

These and other objects of the invention and a better understanding of the principles and details of the invention will be evident from the following description, taken in conjunction with the appended drawings, in which:

FIG. 7 is an enlarged block diagram of the power and control system indicating the use of a function generator and a summing device.

FIGS. 8A and 8B illustrate the operation of the function generator.

FIG. 9 illustrates the fluidic implementation of the overall control system of this invention.

DESCRIPTION OF THE PREFERRED EMBODIMENT

Figure 1:
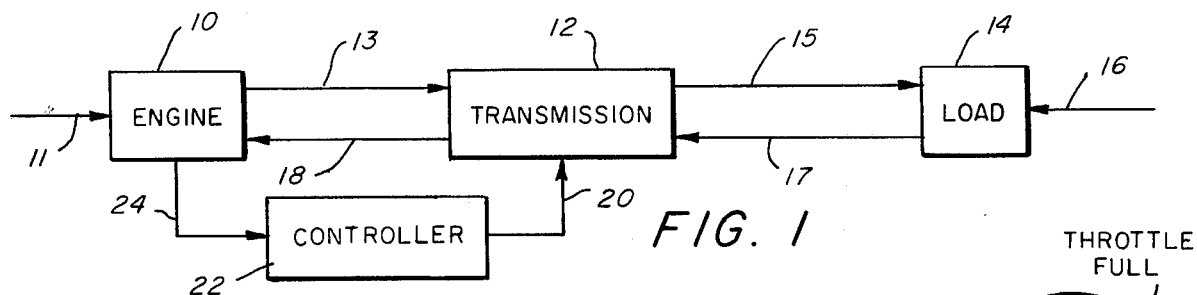
FIG. 1 represents in schematic form the overall engine-transmission system, and the control system.

Referring now to the drawings, FIG. 1 shows in schematic form the overall engine-transmission-load system. It involves an internal combustion engine 10, a hydrostatic transmission 12, and a load 14, which may be a vehicle. Operator control 11 is applied to the engine, speed signal 13 is supplied by the engine to the transmission which provides speed 15 to the load. There is a grade input 16 to the load and the torque 17 required by the load is transmitted back to the transmission which modifies it in terms of the transmission ratio and applies torque 18 back to the engine. The problem is to design the proper speed ratio controller 22 for the HST 12. The controller output is the transmission speed ratio indicated as line 20. One or more variables derived from the engine indicated by line 24, serve as inputs to the controller 22.

For optimum results the transmission should be one that has infinitely variable speed ratio. Such transmission can be a hydrostatic transmission or a hydromechanical transmission or a purely mechanical transmission. For convenience we will designate such infinitely variable transmission as a hydrostatic transmission (HST).

Figure 2:
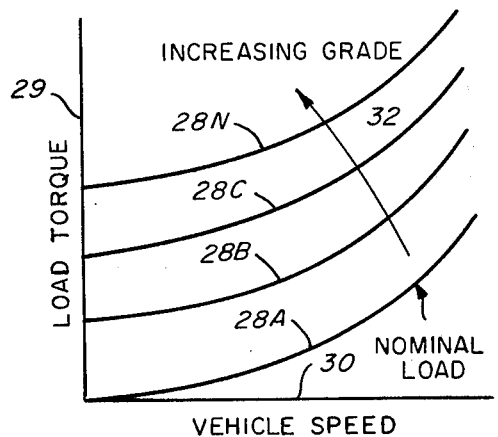
FIG. 2 represents in schematic form the relationship between load torque and vehicle speed.

The natural characteristics of the load are nonlinear. This is indicated in FIG. 2 where curve 28A indicates the relationship of load torque versus speed, for a nominal loading (zero grade). As the grade increases, for example, by driving the vehicle up a steeper grade, the torque requirement increases to characteristics 28B, 28C . . . 28N.

Figure 3:
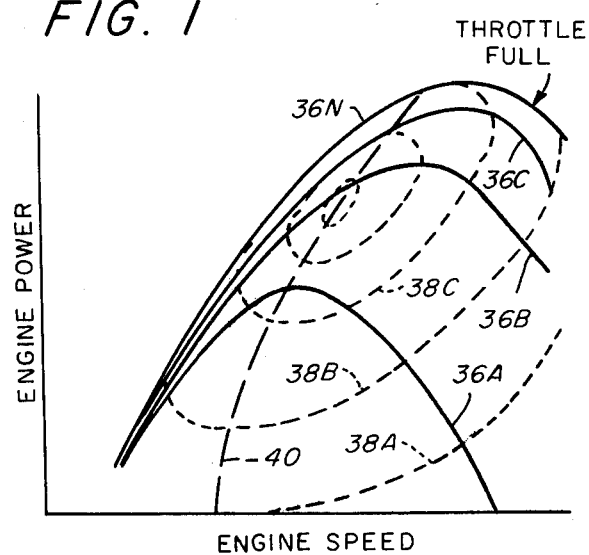
FIG. 3 represents engine characteristics in the form of engine power as ordinate plotted against engine speed.

These characteristics of the engine are shown in FIG. 3 which is a plot of the engine power as a function of engine speed for different throttle settings (solid lines). For a given throttle position, the engine power rises rapidly as engine speed increases, then after teaching a maximum, drops off as speed increases further. With different loading conditions and throttle settings, different curves are provided. Curve 36A, for example, is provided for a low throttle setting. As the throttle setting increases, the characteristic curve of engine power versus engine speed varies to line 36B and so on to 36N. As throttle is increased, the peak power increases, and is shifted to a higher speed. The dashed curves 38A, 38B . . . 38N are lines of constant brake specific fuel consumption and correspond to increasing values of efficiency of the engine. The maximum efficiency for a constant output power condition is provided along a characteristic line 40 which indicates the power speed curve for maximum efficiency, at different values of loading of the engine. Normally, it is desired that engine operation be maintained along this line.

Figure 4:
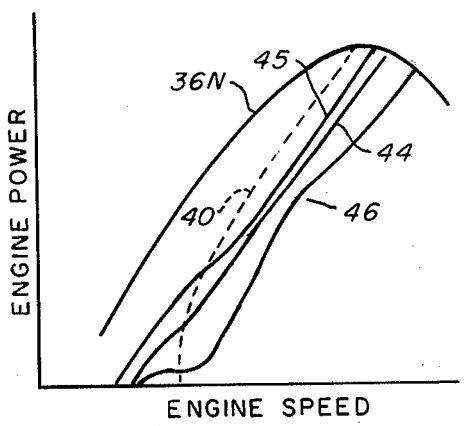
FIG. 4 illustrates a portion of FIG. 3 but modified to take into account the efficiency of the transmission.

In FIG. 4 is shown a variation of a portion of the curves of FIG. 3 which shows the full throttle characteristic 36N and the dashed line 40 which represents the operating characteristic for optimum engine operation. The characteristic 40 includes the effect of engine efficiency alone. There is a variation of this line 40 which is represented by 44 which is obtained by considering also the efficiency of the transmission. In other words, to obtain the ideal characteristic line 40, one hundred percent efficient transmission is required. Inefficiency in the transmission will cause a shift of the line 40 toward the position of line 44, which is optimum operating line including the efficiency of the engine and of the transmission for the nominal load. Limits, such as lines 46, and 45 are provided within which the range of possible loading lies for optimum operation of the engine-transmission system.

Figure 5:
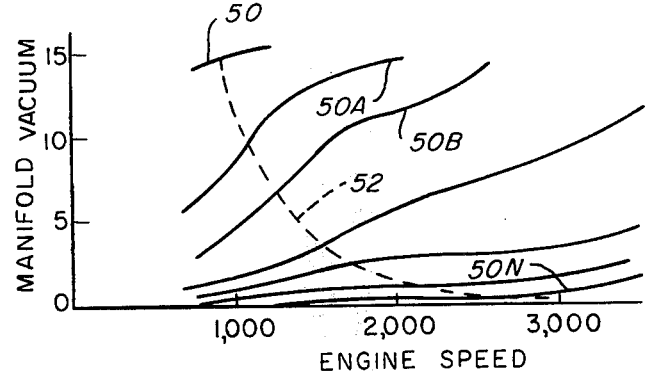
FIG. 5 illustrates actual characteristics of manifold vacuum versus engine speed for different throttle positions.

In the control system of this invention it is desired to use engine manifold vacuum as one of the variables to provide the control. The other variable will be engine speed. In FIG. 5, curves represented by 50A, 50B, 50C . . . 50N are provided for different values of throttle, which show the variation of actual manifold vacuum with engine speed for a typical engine. As speed increases, the manifold vacuum increases.

Figure 6:
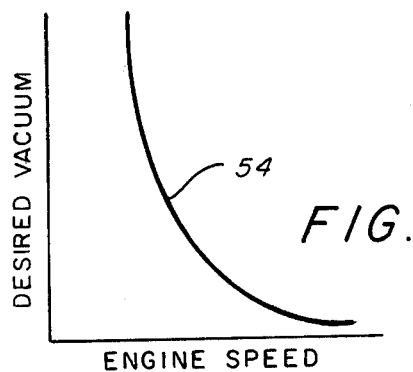
FIG. 6 illustrates the characteristic of desired manifold vacuum versus engine speed.

In FIG. 5, the dashed line identified by numeral 52 is selected as the desired value of engine vacuum as a function of load and engine speed. Operation along curve 52 corresponds to the optimum operation along curve 44 of FIG. 4. This characteristic line 52 is duplicated in FIG. 6 as curve 54. This shows the relationship between the desired manifold vacuum and engine speed, which is to be used in the function generator of the control system.

This use of the inherent characteristic of a proportional fluidic amplifier normally results in a completely satisfactory match to the desired characteristic. With some manufacturers' amplifiers, the inherent characteristic may not match the desired in a completely satisfactory manner. In this case two or more amplifiers connected in cascade, with suitable bias values, can be utilized to achieve an acceptable characteristic.

In FIG. 7 is shown the block diagram of FIG. 1 expanded to include not only engine 10, HST 12 and load 14, but also a schematic of the control system which includes the function generator 62, summer 64, power amplifier 66 and actuator 68. The input to the function generator 62 is the engine speed signal 58. The output of the function generator is a signal 63 which represents desired manifold vacuum. The relationship between signals 58 and 63 is given by curve 54 in FIG. 6. The actual manifold vacuum signal is derived from the engine, and proceeds by line 60 to a summing device 64 which measures the difference between the desired manifold vacuum and the actual manifold vacuum for the actual engine speed. This difference or error signal 65 is then used to control the transmission speed ratio in one direction or the other, in order to bring the actual manifold vacuum to the desired value of manifold vacuum. This error signal is then amplified in 66 and provides a control signal 67 which goes to a hydraulic actuator mechanism 68 to provide the control 70 to alter the transmission ratio in the direction to bring the error signal to a minimum, and therefore to maintain the overall system operation at its optimum condition.

Engine speed is, of course, always one of the important variables of the system. The choice of manifold vacuum as the second variable to be entered into the control system is chosen, not only because of the importance of manifold vacuum as an indicator of engine operation, but also because the relationship between speed and desired manifold vacuum can be duplicated in a fluidic device which forms the function generator of FIG. 7.

In FIG. 8A is illustrated a series of characters 72A, 72B, 72C . . . 72N which are plotted showing desired manifold vacuum as ordinate versus engine speed signal as abscissa for various bias levels 74. This family of curves represents the characteristic of a fluidic device shown in FIG. 8B and indicated by the numeral 80. This fluidic device is a proportional amplifier, which has a fluid supply 81 and has two fluid control inputs 82 and 83. The two inputs 82 and 83 oppose each other and the resulting control of the supply fluid flow 81 into the output line 84 is a function of the relative magnitude of these two opposing fluid control inputs 82 and 83. The fluid input signal 82 comes along line 58 from the engine speed transducer. The fluid input signal 83 is an adjustable, constant pressure, which may be derived from the fluid power source 81. The curves 72 of FIG. 8A illustrate the relationship between the output fluid pressure on line 84, which is identified as the desired vacuum signal, as a function of the engine speed signal on control 82, for various values of constant bias pressure on control 83. It is thus seen that by adjusting the bias pressure on 83 to various values, a family of characteristic, downwardly-sloping lines are obtained between the ordinate of desired vacuum and the abscissa of engine speed signal, one of which will match the curve 54 of FIG. 6. Therefore, by choosing the proper bias value, the function generator will convert the input signal of engine speed 82 into an output signal on line 84 which will indicate the desired value of manifold vacuum.

The fluidic element 80 of FIG. 8B is shown again in somewhat more detail in the overall circuit diagram of FIG. 9. The speed sensor, identified by numeral 86, will be described more in detail in terms of FIGS. 10 and 11. It is a system by which a constant fluid pressure on line 87 is modified by the engine speed on line 88 to provide an output analog pressure on line 82, which is proportional to the engine speed. This signal on line 82 goes to control device 80 which is the function generator.

The control pressure on element 83 is derived from the supply pressure 91 through a variable resistance 93 which can be an adjustable needle valve or similar device, so that the bias pressure may be adjustable. The fluid pressure signal on the output line 84 is proportional to desired manifold vacuum. This signal goes to a summing device indicated by the numeral 96. This is a fluidic device operating with supply fluid pressure at point 100. It has two controls on one side numbered 123 and 124, and two controls on the other side, only one of which, 125, is used. This control 125 is a bias control where the bias pressure is derived from the supply pressure 100 through an adjustable resistance such as a needle valve 102.

Manifold vacuum is a negative (below ambient) pressure, while the desired manifold pressure signal is a positive pressure, and therefore the addition of the two actually produces the difference. In the summing junction the minus pressure on 123 and positive pressure on 124 are added in the cavity, so that the output on lines 103 and 104 provide a differential pressure signal which is a function of the actual sum of the two inputs on controls 123 and 124. When one control is larger than the other in absolute value, there will be one polarity between the two lines 103, 104, and when the other is higher in absolute value the polarity will be reversed. This signal is amplified through a conventional fluidic amplifier 106 and is used to control a pneumatic-hydraulic servovalve 112. This valve is supplied with hydraulic fluid on line 114 and its output is a controlled hydraulic differential pressure along lines 116 and 118. The polarity of this differential pressure varies with the polarity of the pneumatic signal from element 106, so as to control a hydraulic actuator 120. The output of the actuator 120 is a shaft motion which controls the speed ratio of the HST in accordance with the direction and amplitude of rotation of the shaft 122.

Figure 10:
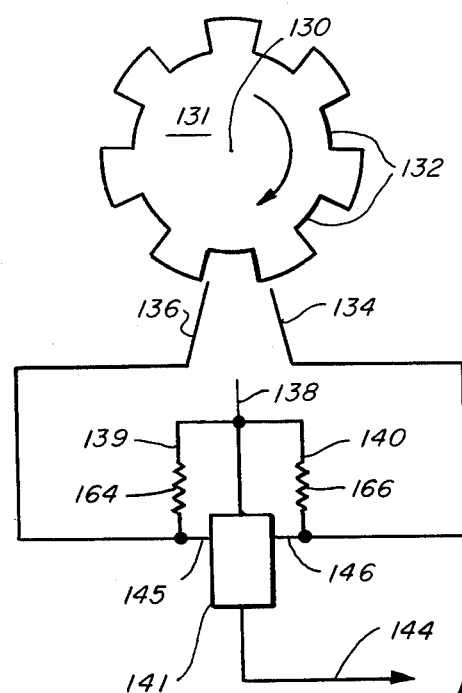
FIGS. 10 and 11 indicate the overall and the detailed fluidic system of the speed transducer.
Figure 11:
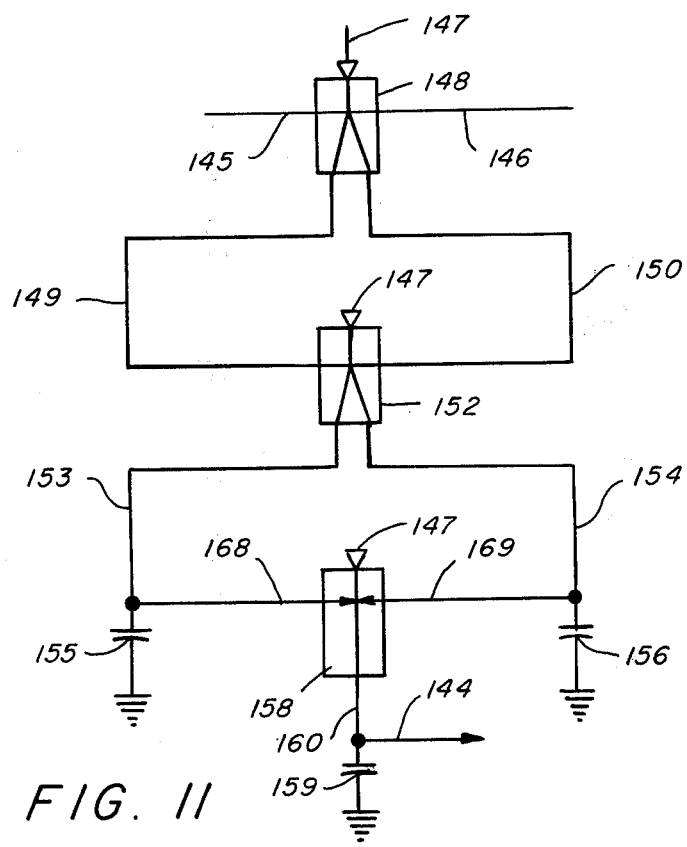

FIGS. 10 and 11 indicate the construction of the engine speed to analog pressure transducer, which provides the speed signal for the control system. A notched disc 131 rotates on an axis 130 at a speed which is proportional to the engine speed. There is a fluidic device 141 which has a supply fluid pressure at 138. This same supply pressure is provided by lines 139 and 140 to the upstream side of resistances 164 and 166. This in turn supplies fluid to the nozzles 136 and 134, which are positioned close to the rim of the disc 131. When one nozzle is opposite a notch the other will be opposite a tooth and vice versa. The proximity of the rim of the tooth, for example, will restrain the flow of fluid out of the nozzle and will build up a pressure in the line leading to the nozzle. For example, consider the situation as shown in FIG. 10. With nozzle 134 against the tooth, the flow of fluid coming by resistor 166 through the nozzle 134 will be restrained and pressure will be built up in this nozzle. This pressure will be reflected in the control input 146. Correspondingly, there is no restriction to flow through nozzle 136 which is opposite a notch, and so the pressure on control 145 will be low. As the notched disc turns, 134 will then be opposite a notch and 136 will be opposite a tooth, and so the pressure relationship will invert and control 145 will be high and 146 will be low.

The device 141 is represented in more detail by the fluidic system of FIG. 11. Thus, controls 145 and 146 are on the bistable fluidic element 148 so that as the pressure reversal takes place, this will be amplified and the output lines 149 and 150 will reflect the same alternating pressure which will be amplified again in element 152. A square wave of pressure appears on the output leads 153, 154 of device 152. These leads are connected to the proportional fluidic rectifying device 158. The controls 168 and 169 are tied to the lines 153 and 154, respectively, which have attached to them fluid capacitances, which, for pneumatic applications are small chambers or fluid capacitances 155, 156. These capacitances 155, 156 and the rectifier element 158 form a frequency sensitive circuit which converts the A.C. pulses into an analog direct pressure which is present on the line 160. This signal is further filtered by a capacitance 159 so that the output signal on line 144 is now an analog pressure signal which is proportional to the input frequency, which is proportional to the rate of passage of teeth and notches past the orifices 136 and 134. This combination of FIGS. 10 and 11, where FIG. 11 shows the detail in the element 141 of FIG. 10, provides the speed sensor which in FIG. 9 is indicated by the numeral 86.

All of the circuits have been described in terms of fluidic or hydraulic devices, all of which are commercial devices available on the market and identified in terms of generic names and/or catalog numbers. The elements used in these circuits are identified below and therefore no more detailed description is required.

Examples of commercial devices which might be used in this invention are:

1. Frequency to analog converter—or fluidic speed sensor. Part 24 MC 12A, General Electric Co., Schenectady, N.Y.
2. Function generator and error amplifier. Part 190807, Corning Glass Works, Corning, New York.
3. Error Summing Junction. Part 190171, Corning Glass Works, Corning, New York.
4. Pneumatic to hydraulic interfacing valve. Part 76 P 100. Moog, Inc. East Auora, N.Y.
5. Displacement Control Actuator. Part S - 250 2V. Ex-Cell-O Corporation, Greenville, Ohio.
6. Variable Speed Hydrostatic Transmission. Model T66Z, Vickers, Mobile Hydraulics Division, Troy, Michigan 48084.

While the description of the fluidic elements has been in terms of pneumatic fluidic elements, it is to be understood that the system is adaptable to the use of liquid fluidic elements. Also, while we have described the control system in terms of fluidic elements, it will be clear that our invention includes other control elements that utilize engine speed and manifold vacuum as control variables.

While the invention has been described with a certain degree of particularity, it is manifest that many changes may be made in the details of construction and the arrangement of components. It is understood that the invention is not to be limited to the specific embodiment set forth herein by way of exemplifying the invention, but the invention is to be limited only by the scope of the attached claim or claims, including the full range of equivalency to which each element or step thereof is entitled.

What is claimed:

1. In a power source-variable speed-transmission-load system in which said power source is an internal combustion engine having a known characteristic of desired manifold vacuum vs. engine speed, said transmission is an infinitely variable transmission having infinitely variable speed ratio, and having a control means for varying said speed ratio, the improvement in automatic control systems for operating said engine at the proper speed for each load to obtain optimum system efficiency, comprising:
   a. transducer means to measure engine speed and generate a speed signal;
   b. function generator means responsive to said transducer means to convert said speed signal to a signal which is a function of desired manifold vacuum;
   c. means to measure actual manifold vacuum;
   d. means to compare said desired with said actual manifold vacuum to obtain an error signal;
   e. means to amplify said error signal; and
   f. means responsive to said amplified error signal to operate said control means on said infinitely variable transmission to vary said speed ratio to reduce said error signal.
2. The system as in claim 1 in which said function generator operates on a curve of desired engine vacuum vs. engine speed the curve being preselected considering the efficiency of the engine alone.
3. The system as in claim 1 in which said function generator operates on a curve of desired engine vacuum vs. engine speed the curve being preselected considering the efficiency of the combination of the engine plus the transmission.
4. The system as in claim 1 in which said control system comprises a fluidic-hydraulic system.
5. The system as in claim 4 in which said fluidic system is a pneumatic system.
6. In a power source-variable speed-transmission-load system in which said power source is an internal combustion engine having a known characteristic of desired manifold vacuum vs. engine speed, said transmission is an infinitely variable transmission having infinitely variable speed ratio, and having a control means for varying said speed ratio, the improvement in automatic control systems for operating said engine at the proper speed for each load to obtain optimum system efficiency, comprising:
   a. transducer means to measure engine speed and convert said engine speed to a fluid pressure speed signal proportional to said speed;
   b. function generator means responsive to said transducer means to convert said fluid pressure speed signal to a fluid pressure proportional to desired manifold vacuum;
   c. means to measure actual manifold vacuum;
   d. means to compare said desired with said actual manifold vacuum to obtain an error signal;
   e. means to amplify said error signal; and
   f. means responsive to said amplified error signal to operate said control means on said infinitely variable transmission to vary said speed ratio to reduce said error signal.
7. The system as in claim 6 in which said transmission is a hydrostatic transmission having infinitely variable speed ratio.
8. The system as in claim 6 in which said transducer means includes notched disc means driven proportional to engine speed, two fluid nozzles, and means to convert the pulsations of pressure in said nozzles to an analog fluid pressure proportional to speed.

* * * * *